United States Patent
Sims et al.

(10) Patent No.: US 11,637,838 B2
(45) Date of Patent: Apr. 25, 2023

(54) SYSTEM FOR INTRUSION DETECTION USING RESOURCE ACTIVITY ANALYSIS

(71) Applicant: BANK OF AMERICA CORPORATION, Charlotte, NC (US)

(72) Inventors: Scott Anderson Sims, Tega Cay, SC (US); Andrew DongHo Kim, Glendale, AZ (US); Craig Douglas Widmann, Chandler, AZ (US); Jeffrey Brian Bashore, Saint Augustine, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 157 days.

(21) Appl. No.: 17/172,234

(22) Filed: Feb. 10, 2021

(65) Prior Publication Data

US 2022/0255946 A1    Aug. 11, 2022

(51) Int. Cl.
*H04L 9/40* (2022.01)
*H04W 12/63* (2021.01)
*H04W 12/08* (2021.01)

(52) U.S. Cl.
CPC ........... *H04L 63/107* (2013.01); *H04W 12/08* (2013.01); *H04W 12/63* (2021.01)

(58) Field of Classification Search
CPC ...... H04L 63/107; H04W 12/08; H04W 12/63
See application file for complete search history.

(56) References Cited

U.S. PATENT DOCUMENTS

| | | | |
|---|---|---|---|
| 8,558,663 B2 * | 10/2013 | Newman | G07F 19/20 340/5.4 |
| 9,619,639 B2 * | 4/2017 | Donenfeld | G07C 9/257 |
| 10,846,261 B2 | 11/2020 | Barday et al. | |
| 10,846,433 B2 | 11/2020 | Brannon et al. | |
| 10,848,523 B2 | 11/2020 | Brannon et al. | |
| 10,853,501 B2 | 12/2020 | Brannon | |
| 10,853,859 B2 | 12/2020 | Barday | |
| 10,867,007 B2 | 12/2020 | Barday et al. | |
| 10,867,072 B2 | 12/2020 | Barday et al. | |
| 10,873,606 B2 | 12/2020 | Brannon et al. | |
| 10,878,127 B2 | 12/2020 | Brannon et al. | |
| 10,885,485 B2 | 1/2021 | Brannon et al. | |
| 10,896,394 B2 | 1/2021 | Brannon et al. | |
| 10,909,265 B2 | 2/2021 | Jones et al. | |

(Continued)

*Primary Examiner* — Robert B Leung
(74) *Attorney, Agent, or Firm* — Moore & Van Allen PLLC; Anup Shrinivasan Iyer

(57) ABSTRACT

Systems, computer program products, and methods are described herein for intrusion detection using resource activity analysis. The present invention is configured to receive, from a computing device of a user, an indication that the user has accessed a resource allocation portfolio of a customer; determine a geographic information of the user; retrieve a geographic information of the customer; determine that the geographic information of the user does not match the geographic information of the customer; determine an exposure level associated with the user access of the resource allocation portfolio of the customer; determine that the exposure level is greater than a predetermined threshold; and automatically trigger a transmission of a notification to a computing device of an administrator indicating that the exposure level associated with the user access of the resource allocation portfolio of the customer is greater than the predetermined threshold.

18 Claims, 2 Drawing Sheets

(56) References Cited

U.S. PATENT DOCUMENTS

| | | | |
|---|---|---|---|
| 10,929,559 B2 | 2/2021 | Brannon et al. | |
| 10,944,725 B2 | 3/2021 | Gunasingam et al. | |
| 10,949,170 B2 | 3/2021 | Barday et al. | |
| 10,949,544 B2 | 3/2021 | Brannon et al. | |
| 10,949,565 B2 | 3/2021 | Barday et al. | |
| 10,949,567 B2 | 3/2021 | Barday et al. | |
| 10,963,572 B2 | 3/2021 | Belfiore, Jr. et al. | |
| 10,963,591 B2 | 3/2021 | Brannon et al. | |
| 10,970,371 B2 | 4/2021 | Barday et al. | |
| 10,970,675 B2 | 4/2021 | Barday et al. | |
| 10,972,509 B2 | 4/2021 | Barday et al. | |
| 10,984,132 B2 | 4/2021 | Barday et al. | |
| 10,997,318 B2 | 5/2021 | Barday et al. | |
| 2007/0055672 A1* | 3/2007 | Stevens | H04L 63/107 |
| 2008/0318616 A1* | 12/2008 | Chipalkatti | H04W 12/086 |
| | | | 455/550.1 |
| 2010/0121929 A1* | 5/2010 | Lin | H04L 67/535 |
| | | | 726/1 |
| 2013/0167203 A1* | 6/2013 | Etchegoyen | H04L 63/0861 |
| | | | 726/4 |
| 2013/0262303 A1* | 10/2013 | Metral | G07F 19/20 |
| | | | 705/43 |
| 2015/0026026 A1* | 1/2015 | Calman | G06Q 20/3265 |
| | | | 705/35 |
| 2016/0275285 A1* | 9/2016 | Childress | H04L 63/107 |
| 2018/0060928 A1* | 3/2018 | Sadler | G06Q 20/20 |

\* cited by examiner

SYSTEM FOR INTRUSION DETECTION USING RESOURCE ACTIVITY ANALYSIS

FIELD OF THE INVENTION

The present invention embraces a system for intrusion detection using resource activity analysis.

BACKGROUND

Effective resource management within any entity has grown in importance in recent years. There is a need for a system for intrusion detection using resource activity analysis.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intrusion detection using resource activity analysis is presented. The system comprising: at least one non-transitory storage device; and at least one processing device coupled to the at least one non-transitory storage device, wherein the at least one processing device is configured to: electronically receive, from a computing device of a user, an indication that the user has accessed a resource allocation portfolio of a customer; determine a geographic information of the user based on at least receiving the indication that the user has accessed the resource allocation portfolio of the customer; retrieve a geographic information of the customer; determine that the geographic information of the user does not match the geographic information of the customer; determine an exposure level associated with the user access of the resource allocation portfolio of the customer based on at least determining that the geographic information of the user does not match the geographic information of the customer; determine that the exposure level is greater than a predetermined threshold; and automatically trigger a transmission of a notification to a computing device of an administrator indicating that the exposure level associated with the user access of the resource allocation portfolio of the customer is greater than the predetermined threshold.

In some embodiments, the at least one processing device is further configured to: determine that the exposure level is greater than a predetermined threshold; and transmit control signals configured to cause the computing device of the user to restrict access to the resource allocation portfolio of the customer.

In some embodiments, the at least one processing device is further configured to: electronically receive, from the computing device of the user, a request to access the resource allocation portfolio of the customer; initiate, via the computing device of the user, an authentication request in response to receiving the request to access the resource allocation portfolio of the customer; electronically receive, from the computing device of the user, one or more authentication credentials in response to the authentication request; validate the one or more authentication credentials to verify an identity of the user; and authorize the user to access the resource allocation portfolio of the customer based on at least verifying the identity of the user.

In some embodiments, the at least one processing device is further configured to: determine an authorization level of the user based on at least the one or more authentication credentials; determine an authorization requirement associated with the resource allocation portfolio of the customer; determine that the authorization level of the user meets the authorization requirement of the resource allocation portfolio of the user; and authorize the user to access the resource allocation portfolio based on at least determining that the authorization level of the user meets the authorization requirement of the resource allocation portfolio of the user.

In some embodiments, the at least one processing device is further configured to: determine a number of times the resource allocation portfolio of the user has been accessed by the user within a predetermined period of time; determine an exposure level associated with the user access of the resource allocation portfolio of the customer based on at least the number of times the resource allocation portfolio of the user has been accessed by the user within the predetermined period of time.

In some embodiments, the at least one processing device is further configured to: determine that the geographic information of the user does not match the geographic information of the customer; determine a geographic location of the customer at a time the user has accessed the resource allocation portfolio of the customer; determine that the geographic information of the user matches the geographic location of the customer; and allow the user to continue accessing the resource allocation portfolio based on at least determining that the geographic information of the user matches the geographic location of the customer.

In another aspect, a computer program product for intrusion detection using resource activity analysis is presented. The computer program product comprising a non-transitory computer-readable medium comprising code causing a first apparatus to: electronically receive, from a computing device of a user, an indication that the user has accessed a resource allocation portfolio of a customer; determine a geographic information of the user based on at least receiving the indication that the user has accessed the resource allocation portfolio of the customer; retrieve a geographic information of the customer; determine that the geographic information of the user does not match the geographic information of the customer; determine an exposure level associated with the user access of the resource allocation portfolio of the customer based on at least determining that the geographic information of the user does not match the geographic information of the customer; determine that the exposure level is greater than a predetermined threshold; and automatically trigger a transmission of a notification to a computing device of an administrator indicating that the exposure level associated with the user access of the resource allocation portfolio of the customer is greater than the predetermined threshold.

In yet another aspect, a method for intrusion detection using resource activity analysis is presented. The method comprising: electronically receiving, from a computing device of a user, an indication that the user has accessed a resource allocation portfolio of a customer; determining a geographic information of the user based on at least receiving the indication that the user has accessed the resource allocation portfolio of the customer; retrieving a geographic information of the customer; determining that the geographic information of the user does not match the geographic information of the customer; determining an exposure level associated with the user access of the resource allocation portfolio of the customer based on at least determining that the geographic information of the user does not match the geographic information of the customer; determining that the exposure level is greater than a predetermined threshold; and automatically triggering a transmission of a notification to a computing device of an administrator indicating that the exposure level associated with the user access of the resource allocation portfolio of the customer is greater than the predetermined threshold.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
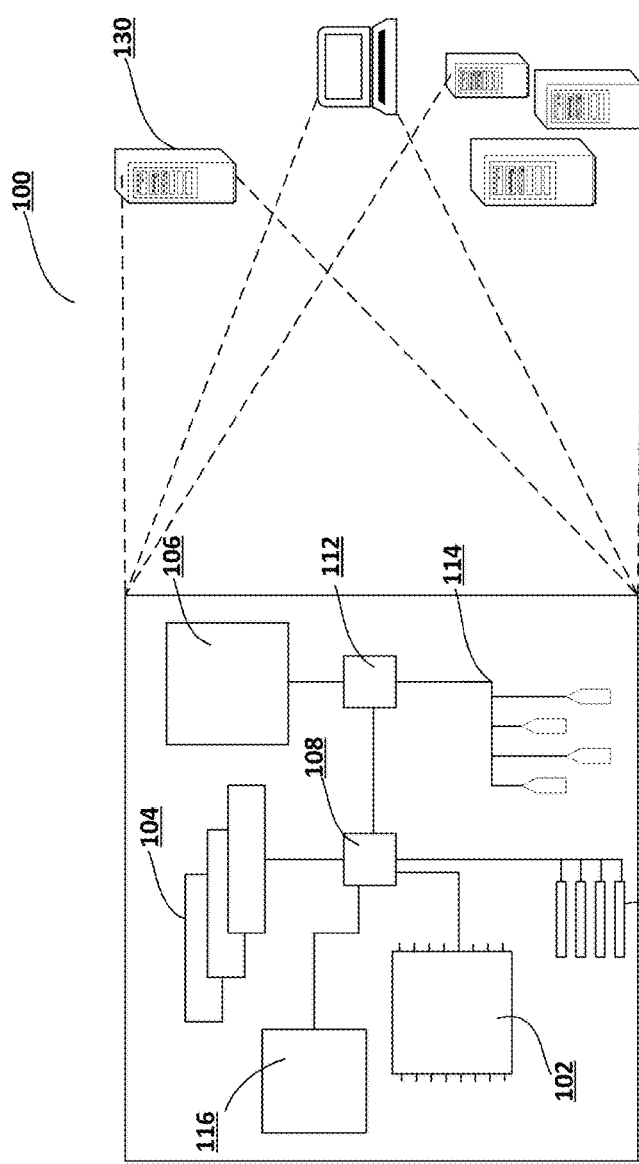
Figure 1:
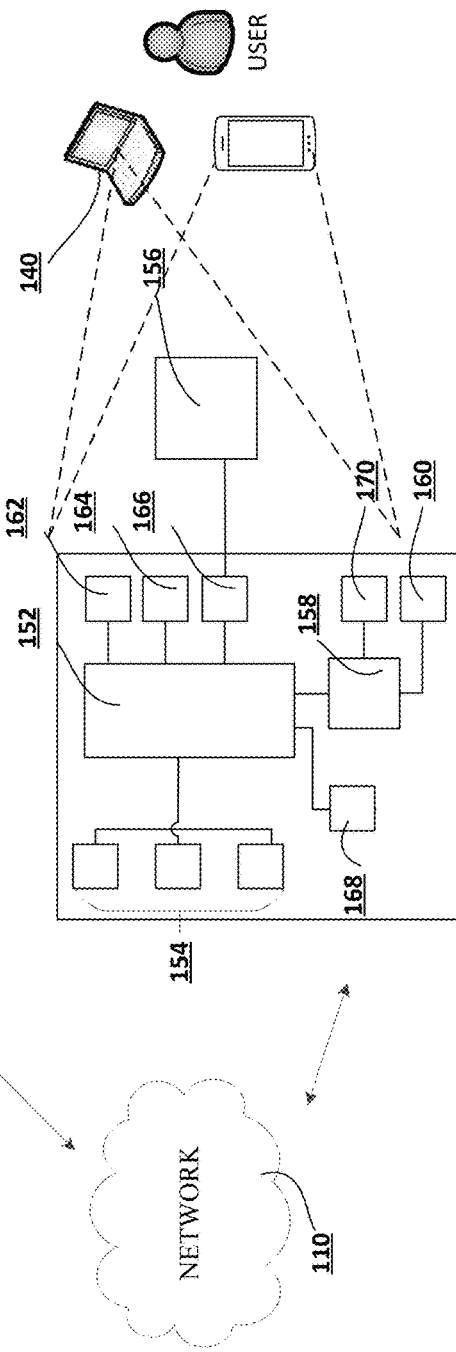
Figure 2:
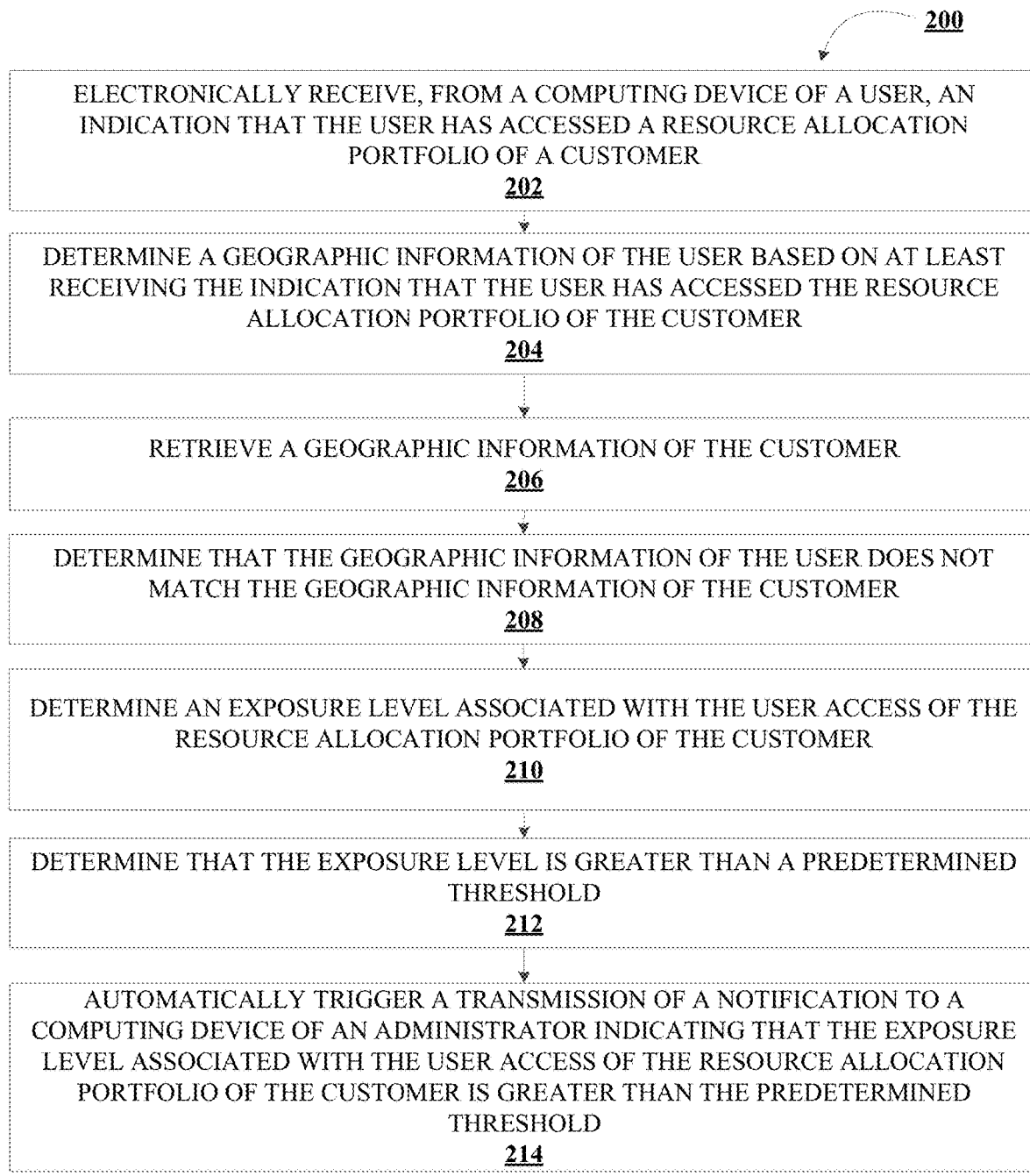

Having thus described embodiments of the invention in general terms, reference will now be made the accompanying drawings, wherein:

FIG. 1 illustrates technical components of a system for intrusion detection using resource activity analysis, in accordance with an embodiment of the invention;

FIG. 2 illustrates a process flow for intrusion detection using resource activity analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a customer, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource allocation portfolio" may refer to an implementation of resource allocation strategy of the customer by which the customer adjusts an allocation of resources across their resource portfolio with the entity. For example, the resource allocation portfolio may refer to a snapshot (e.g., balance) of the customer accounts maintained by the customer with the entity.

As used herein, a "resource transfer," "resource distribution," or "resource allocation" may refer to any transaction, activities or communication between the user and the entity. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

FIG. 1 presents an exemplary block diagram of the system environment for intrusion detection using resource activity analysis 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for intrusion detection using resource activity analysis 200, in accordance with an embodiment of the invention. As shown in block 202, the process flow includes electronically receiving, from a computing device of a user, an indication that the user has accessed a resource allocation portfolio of a customer. In some embodiments, the system may be configured to electronically receive, from the computing device of the user, a request to access the resource allocation portfolio of the customer. In response, the system may be configured to initiate, via the computing device of the user, an authentication request in response to receiving the request to access the resource allocation portfolio of the customer. In response to the authentication request, the system may be configured to electronically receive, from the computing device of the user, one or more authentication credentials of the user.

Based on receiving the authentication credentials, the system may be configured to process and validate the one or more authentication credentials to verify an identity of the user. In validating the one or more authentication credentials, the system may be configured to determine an authorization level of the user based on at least the one or more authentication credentials. In addition, the system may be configured to determine an authorization requirement associated with the resource allocation portfolio of the customer. In response, the system may be configured to determine that the authorization level of the user meets the authorization requirement of the resource allocation portfolio of the user. In response, the system may be configured to authorize the user to access the resource allocation portfolio of the customer based on at least verifying the identity of the user and determining that the authorization level of the user meets the authorization requirement of the resource allocation portfolio of the user.

Next, as shown in block 204, the process flow includes determining a geographic information of the user based on at least receiving the indication that the user has accessed the resource allocation portfolio of the customer. In some embodiments, the geographic information of the user may include information about the geographic position of an active computing device used by the user when attempting to access the resource allocation portfolio of the customer. In one aspect, the system may be configured to obtain the geographic position independently of the network via technologies such as GPS or can be supplied by the network itself (e.g., using various device identification techniques).

Next, as shown in block 206, the process flow includes retrieving a geographic information of the customer. In some embodiments, the geographic information of the customer may include information about a specific geographic region associated with the resource allocation portfolio of the customer. Each customer may manage their resource allocation portfolio with a resource distribution location maintained by the entity. In one aspect, the resource distribution location may be a physical location where the customer may approach users (e.g., employees) associated with the entity to initiate and execute transfer of resources using their resource allocation portfolio. Typically, each customer has their own preferred geographic region of operation where they tend to choose to interact with entities who also have a physical presence (e.g., resource distribution location) in that region. When a customer approaches the user associated with of the entity at the resource distribution location to initiate an execution of resource transfers, the user accesses the resource allocation portfolio of the customer.

In some embodiments, the user may have the authority to access the resource allocation portfolio of the customer only when the customer approaches the user at the resource distribution location to initiate the execution of resource transfers. Therefore, in instances when the system receives an indication that the user has accessed the resource allocation portfolio of a customer, the system may be configured to determine whether the geographic information of the user matches the geographic information of the customer. In some embodiments, the system may be configured to determine whether the distance between the geographic information of the user and the geographic information of the customer is within a predetermined threshold. For example, if the customer is at the resource distribution location of an entity, the geographic information of the user accessing the resource allocation portfolio of the customer at the resource distribution location and the geographic information of the customer must overlap as they are located in the same place.

Next, as shown in block 208, the process flow includes determining that the geographic information of the user does not match the geographic information of the customer. Even if the user is authorized to access the resource allocation portfolios of customers at all times, the user does not have any reason to access a resource allocation portfolio of a customer unless the customer is physically present at the resource distribution location of the entity with the user and wishes to initiate and/or execute a resource transfer. If the geographic information of the customer does not match the geographic information of the user when the user is accessing the resource allocation portfolio, it may be an indication of misappropriate activity on the part of the user. In some embodiments, the user may have approached a resource distribution location associated with the entity that is in a geographic location that is different from that of the resource distribution location where they typically manage their resource allocation portfolio. In such cases, the geographic information of the user will likely not match the geographic information of the customer. In response, the system may be configured to determine the geographic location of the customer at a time the user has accessed the resource allocation portfolio of the customer. In some other embodiments, the system may be configured to determine the geographic location of the customer based on at least retrieving real-time geographic location information from a computing device of the customer. In response, the system may be configured to determine that the geographic information of the user matches the geographic location of the customer, i.e., the customer is indeed physically located at the resource distribution location where the user is accessing the resource allocation portfolio of the customer. In response, the system may be configured to allow the user to continue accessing the resource allocation portfolio of the customer.

In addition to confirming the presence of the customer using geographic location information retrieved from their computing device, the system may be configured to confirm physical presence of the customer at the resource distribution location. Accordingly, the system may be configured to establish a communication link with an image capturing device associated with the resource distribution location. In one aspect, the image capturing device may be associated with a security system that is operatively connected to the system via a communication network (e.g., network 110 in FIG. 1). In response, the system may be configured to access, via the communication link, one or more real-time images of one or more customers captured by the image capturing device at the time the user is accessing the resource allocation portfolio of the customer. In response, the system may be configured to identify, using one or more facial recognition algorithms, the customer from the one or more real-time images. In some embodiments, during the customer onboarding process, customers may be required to provide images of themselves to the entity for identification purposes. The images captured using the image captured device may be compared to these pre-existing customer images using the facial recognition algorithms to determine a match. In embodiments contemplated herein, any facial recognition algorithm capable of matching a human face from a digital image or a video frame against a database of faces by pinpointing and measuring facial features from a given image, or any applicable facial recognition techniques may be implemented to achieve the objective. In response, the system may be configured to identify, using one or more facial recognition algorithms, the customer from the one or more real-time images. In response, the system may be configured to allow the user to continue accessing the resource allocation portfolio based on at least identifying the customer from the one or more real-time images at the time the user is accessing the resource allocation portfolio of the customer.

Next, as shown in block 210, the process flow includes determining an exposure level associated with the user access of the resource allocation portfolio of the customer. In some embodiments, the exposure level may be assessed by identifying and analyzing the likelihood that an event (e.g., user access of the resource allocation portfolio of the customer when there is a mismatch of geographic information) will negatively impact the customer and/or the entity, and their respective resources. Based on the likelihood of negative impact, the system may be configured to determine the exposure level indicating a qualitative and/or quantitative measure of tolerance that is acceptable by the entity during the occurrence of the event. In some embodiments, the exposure level may be determined based on one or more parameters, including but not limited to the resource type associated with the resources accessed by the user, a number of instances the resource allocation portfolio of the user has been accessed by the user within a predetermined period of time, i.e., frequency of access, an access window associated with the each of the user's access of the resource allocation portfolio of the user, a number of resource transfers executed by the user during each access window, a type of resource transfer executed by the user during each access window, and/or the like. In some embodiments, the exposure level may be determined as a weighted average of the one or more parameters.

Next, as shown in block 212, the process flow includes determining that the exposure level is greater than a predetermined threshold. Next, as shown in block 214, the process flow includes automatically triggering a transmission of a notification to a computing device of an administrator indicating that the exposure level associated with the user access of the resource allocation portfolio of the customer is greater than the predetermined threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intrusion detection using resource activity analysis, the system comprising:
at least one non-transitory storage device; and
at least one processing device coupled to the at least one non-transitory storage device, wherein the at least one processing device is configured to:
electronically receive, from a computing device of a user, an indication that the user has accessed a resource allocation portfolio of a customer, wherein the computing device of the user is associated with a resource distribution location associated with an entity;
determine a geographic information of the user based on at least receiving the indication that the user has accessed the resource allocation portfolio of the customer;
retrieve a geographic information of the customer;
determine that the geographic information of the user does not match the geographic information of the customer;
determine an exposure level associated with the user access of the resource allocation portfolio of the customer based on at least determining that the geographic information of the user does not match the geographic information of the customer;
determine that the exposure level is greater than a predetermined threshold;
responsive to determining that the exposure level is greater than the predetermined threshold, automatically trigger a transmission of a notification to a computing device of an administrator indicating that the exposure level associated with the user access of the resource allocation portfolio of the customer is greater than the predetermined threshold;
establish a communication link with an image capturing device associated with the resource distribution location;
access, via the communication link, one or more real-time images of one or more customers captured by the image capturing device at the time the user is accessing the resource allocation portfolio of the customer;
identify, using one or more facial recognition algorithms, the customer from the one or more real-time images; and
allow the user to continue accessing the resource allocation portfolio based on at least identifying the customer from the one or more real-time images at the time the user is accessing the resource allocation portfolio of the customer.

2. The system of claim 1, wherein the at least one processing device is further configured to:
responsive to determining that the exposure level is greater than the predetermined threshold, transmit control signals configured to cause the computing device of the user to restrict access to the resource allocation portfolio of the customer.

3. The system of claim 1, wherein the at least one processing device is further configured to:
initiate, via the computing device of the user, an authentication request in response to receiving the request to access the resource allocation portfolio of the customer;
electronically receive, from the computing device of the user, one or more authentication credentials in response to the authentication request;
validate the one or more authentication credentials to verify an identity of the user; and
authorize the user to access the resource allocation portfolio of the customer based on at least verifying the identity of the user.

4. The system of claim 3, wherein the at least one processing device is further configured to:

determine an authorization level of the user based on at least the one or more authentication credentials;
determine an authorization requirement associated with the resource allocation portfolio of the customer;
determine that the authorization level of the user meets the authorization requirement of the resource allocation portfolio of the customer; and
authorize the user to access the resource allocation portfolio of the customer based on at least determining that the authorization level of the user meets the authorization requirement of the resource allocation portfolio of the customer.

5. The system of claim 1, wherein the at least one processing device is further configured to:
determine a number of instances the resource allocation portfolio of the customer has been accessed by the user within a predetermined period of time;
determine an exposure level associated with the user access of the resource allocation portfolio of the customer based on at least the number of instances the resource allocation portfolio of the customer has been accessed by the user within the predetermined period of time.

6. The system of claim 1, wherein the at least one processing device is further configured to:
determine a geographic location of the customer at a time the user has accessed the resource allocation portfolio of the customer;
determine that the geographic information of the user matches the geographic location of the customer; and
allow the user to continue accessing the resource allocation portfolio based on at least determining that the geographic information of the user matches the geographic location of the customer.

7. A computer program product for intrusion detection using resource activity analysis, the computer program product comprising a non-transitory computer-readable medium comprising code causing a first apparatus to:
electronically receive, from a computing device of a user, an indication that the user has accessed a resource allocation portfolio of a customer, wherein the computing device of the user is associated with a resource distribution location associated with an entity;
determine a geographic information of the user based on at least receiving the indication that the user has accessed the resource allocation portfolio of the customer;
retrieve a geographic information of the customer;
determine that the geographic information of the user does not match the geographic information of the customer;
determine an exposure level associated with the user access of the resource allocation portfolio of the customer based on at least determining that the geographic information of the user does not match the geographic information of the customer;
determine that the exposure level is greater than a predetermined threshold;
automatically trigger a transmission of a notification to a computing device of an administrator indicating that the exposure level associated with the user access of the resource allocation portfolio of the customer is greater than the predetermined threshold;
establish a communication link with an image capturing device associated with the resource distribution location;
access, via the communication link, one or more real-time images of one or more customers captured by the image capturing device at the time the user is accessing the resource allocation portfolio of the customer;
identify, using one or more facial recognition algorithms, the customer from the one or more real-time images; and
allow the user to continue accessing the resource allocation portfolio based on at least identifying the customer from the one or more real-time images at the time the user is accessing the resource allocation portfolio of the customer.

8. The computer program product of claim 7, wherein the first apparatus is further configured to:
responsive to determining that the exposure level is greater than the predetermined threshold, transmit control signals configured to cause the computing device of the user to restrict access to the resource allocation portfolio of the customer.

9. The computer program product of claim 7, wherein the first apparatus is further configured to:
initiate, via the computing device of the user, an authentication request in response to receiving the request to access the resource allocation portfolio of the customer;
electronically receive, from the computing device of the user, one or more authentication credentials in response to the authentication request;
validate the one or more authentication credentials to verify an identity of the user; and
authorize the user to access the resource allocation portfolio of the customer based on at least verifying the identity of the user.

10. The computer program product of claim 9, wherein the first apparatus is further configured to:
determine an authorization level of the user based on at least the one or more authentication credentials;
determine an authorization requirement associated with the resource allocation portfolio of the customer;
determine that the authorization level of the user meets the authorization requirement of the resource allocation portfolio of the customer; and
authorize the user to access the resource allocation portfolio of the customer based on at least determining that the authorization level of the user meets the authorization requirement of the resource allocation portfolio of the customer.

11. The computer program product of claim 7, wherein the first apparatus is further configured to:
determine a number of instances the resource allocation portfolio of the customer has been accessed by the user within a predetermined period of time;
determine an exposure level associated with the user access of the resource allocation portfolio of the customer based on at least the number of instances the resource allocation portfolio of the customer has been accessed by the user within the predetermined period of time.

12. The computer program product of claim 7, wherein the first apparatus is further configured to:
determine a geographic location of the customer at a time the user has accessed the resource allocation portfolio of the customer;
determine that the geographic information of the user matches the geographic location of the customer; and
allow the user to continue accessing the resource allocation portfolio based on at least determining that the geographic information of the user matches the geographic location of the customer.

13. A method for intrusion detection using resource activity analysis, the method comprising:
- electronically receiving, from a computing device of a user, an indication that the user has accessed a resource allocation portfolio of a customer, wherein the computing device of the user is associated with a resource distribution location associated with an entity;
- determining a geographic information of the user based on at least receiving the indication that the user has accessed the resource allocation portfolio of the customer;
- retrieving a geographic information of the customer;
- determining that the geographic information of the user does not match the geographic information of the customer;
- determining an exposure level associated with the user access of the resource allocation portfolio of the customer based on at least determining that the geographic information of the user does not match the geographic information of the customer;
- determining that the exposure level is greater than a predetermined threshold;
- automatically triggering a transmission of a notification to a computing device of an administrator indicating that the exposure level associated with the user access of the resource allocation portfolio of the customer is greater than the predetermined threshold;
- establishing a communication link with an image capturing device associated with the resource distribution location;
- accessing, via the communication link, one or more real-time images of one or more customers captured by the image capturing device at the time the user is accessing the resource allocation portfolio of the customer;
- identifying, using one or more facial recognition algorithms, the customer from the one or more real-time images; and
- allowing the user to continue accessing the resource allocation portfolio based on at least identifying the customer from the one or more real-time images at the time the user is accessing the resource allocation portfolio of the customer.

14. The method of claim 13, wherein the method further comprises:
- responsive to determining that the exposure level is greater than the predetermined threshold, transmitting control signals configured to cause the computing device of the user to restrict access to the resource allocation portfolio of the customer.

15. The method of claim 13, wherein the method further comprises:
- initiating, via the computing device of the user, an authentication request in response to receiving the request to access the resource allocation portfolio of the customer;
- electronically receiving, from the computing device of the user, one or more authentication credentials in response to the authentication request;
- validating the one or more authentication credentials to verify an identity of the user; and
- authorizing the user to access the resource allocation portfolio of the customer based on at least verifying the identity of the user.

16. The method of claim 15, wherein the method further comprises:
- determining an authorization level of the user based on at least the one or more authentication credentials;
- determining an authorization requirement associated with the resource allocation portfolio of the customer;
- determining that the authorization level of the user meets the authorization requirement of the resource allocation portfolio of the customer; and
- authorizing the user to access the resource allocation portfolio of the customer based on at least determining that the authorization level of the user meets the authorization requirement of the resource allocation portfolio of the customer.

17. The method of claim 13, wherein the method further comprises:
- determining a number of instances the resource allocation portfolio of the customer has been accessed by the user within a predetermined period of time;
- determining an exposure level associated with the user access of the resource allocation portfolio of the customer based on at least the number of instances the resource allocation portfolio of the customer has been accessed by the user within the predetermined period of time.

18. The method of claim 13, wherein the method further comprises:
- determining a geographic location of the customer at a time the user has accessed the resource allocation portfolio of the customer;
- determining that the geographic information of the user matches the geographic location of the customer; and
- allowing the user to continue accessing the resource allocation portfolio based on at least determining that the geographic information of the user matches the geographic location of the customer.

* * * * *